(12) United States Patent
Duggan et al.

(10) Patent No.: US 11,142,999 B2
(45) Date of Patent: Oct. 12, 2021

(54) DOWNHOLE POWER GENERATION USING PRESSURE DIFFERENTIAL

(71) Applicants: Andrew Duggan, Houston, TX (US); Christopher Ryan Hern, Porter, TX (US); Daniel Ewing, Katy, TX (US)

(72) Inventors: Andrew Duggan, Houston, TX (US); Christopher Ryan Hern, Porter, TX (US); Daniel Ewing, Katy, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 206 days.

(21) Appl. No.: 16/399,619

(22) Filed: Apr. 30, 2019

(65) Prior Publication Data

US 2020/0347702 A1 Nov. 5, 2020

(51) Int. Cl.
*E21B 41/00* (2006.01)
*H02K 11/00* (2016.01)
(Continued)

(52) U.S. Cl.
CPC .......... *E21B 41/0085* (2013.01); *E21B 34/06* (2013.01); *H02K 11/0094* (2013.01); *H02K 35/02* (2013.01)

(58) Field of Classification Search
CPC ...... E21B 34/06; E21B 34/0666; E21B 34/08; E21B 41/0085; H02K 11/0094; H02K 35/02
(Continued)

(56) References Cited

U.S. PATENT DOCUMENTS

| 5,149,984 A | 9/1992 | Schultz et al. |
| 5,696,413 A | 12/1997 | Woodbridge et al. |

(Continued)

FOREIGN PATENT DOCUMENTS

| WO | 2006085869 A1 | 8/2006 |
| WO | 2016094748 A1 | 6/2016 |

OTHER PUBLICATIONS

International Search Report for International Application No. PCT/US2020/021418, International Filing Date: Mar. 6, 2020, dated Jul. 3, 2020, 7 pages.
(Continued)

*Primary Examiner* — Tulsidas C Patel
*Assistant Examiner* — Rashad H Johnson
(74) *Attorney, Agent, or Firm* — Cantor Colburn LLP

(57) ABSTRACT

An apparatus for generating electrical power includes at least one power generation assembly having a housing including a fluid chamber, one or more conductive coils surrounding the fluid chamber, a reciprocating magnetic shuttle dividing the fluid chamber into a first volume and a second volume. The apparatus also includes at least one switching assembly configured to alternate between a first operating state where the first volume is in fluid communication with a first fluid pressure source, and a second operating state where the first volume is in fluid communication with a second fluid pressure source. The switching assembly is configured to alternate between the first operating state and the second operating state to alternate a direction of differential pressure between the first volume and the second volume and cause the magnetic shuttle to move in a reciprocating motion and generate an electric current in the one or more conductive coils.

20 Claims, 8 Drawing Sheets

(51) Int. Cl.
*H02K 35/02* (2006.01)
*E21B 34/06* (2006.01)

(58) Field of Classification Search
USPC .......................................... 310/15; 175/107
See application file for complete search history.

(56) References Cited

U.S. PATENT DOCUMENTS

| | | | |
|---|---|---|---|
| 5,839,508 | A | 11/1998 | Tubel et al. |
| 6,791,205 | B2 | 9/2004 | Woodbridge |
| 7,242,103 | B2 * | 7/2007 | Tips .................... E21B 41/0085 290/1 R |
| 9,528,349 | B2 | 12/2016 | Zimmerman |
| 2002/0112859 | A1 | 8/2002 | Bloom et al. |
| 2003/0116969 | A1 | 6/2003 | Skinner et al. |
| 2006/0099093 | A1 * | 5/2006 | Brennan, III ........... F04B 47/08 417/423.3 |
| 2010/0000731 | A1 * | 1/2010 | Gordon ............... B01F 11/0054 166/264 |
| 2011/0030976 | A1 | 2/2011 | King |
| 2011/0057449 | A1 | 3/2011 | Marya et al. |
| 2011/0148656 | A1 | 6/2011 | Hudson et al. |
| 2011/0155393 | A1 | 6/2011 | Loretz et al. |
| 2014/0041876 | A1 | 2/2014 | Flockenstein et al. |
| 2014/0076560 | A1 | 3/2014 | Kenyon et al. |
| 2016/0130910 | A1 | 5/2016 | Gonzalez et al. |
| 2016/0341002 | A1 | 11/2016 | McKitrick, III |
| 2018/0306003 | A1 | 10/2018 | Purkis et al. |
| 2020/0208498 | A1 | 7/2020 | Duggan et al. |

OTHER PUBLICATIONS

Written Opinion for International Application No. PCT/US2020/021418, International Filing Date: Mar. 6, 2020, dated Jul. 3, 2020, 7 pages.
International Search Report for International Application No. PCT/US2020/024847, International Filing Date Mar. 26, 2020, dated Jul. 13, 2020, 6 pages.
Written Opinion for International Application No. PCT/US2020/024847, International Filing Date Mar. 26, 2020, dated Jul. 13, 2020, 6 pages.
International Search Report and Written Opinion for International Application No. PCT/US2019/059970; International Filing Date Nov. 6, 2019; dated Apr. 8, 2020; 9 pages.

* cited by examiner

DOWNHOLE POWER GENERATION USING PRESSURE DIFFERENTIAL

BACKGROUND

In the resource recovery industry, various downhole tools are employed for purposes such as flow control, drilling, directional drilling and formation property measurements. Examples of such tools include logging-while-drilling (LWD) and measurement-while-drilling (MWD) tools. Some downhole tools generally require electrical power to operate, which can be provided by surface power supplies or by downhole power generators or power supplies.

SUMMARY

An embodiment of an apparatus for generating electrical power includes at least one power generation assembly having a housing including a fluid chamber configured to exchange or receive a fluid, one or more conductive coils surrounding the fluid chamber, a reciprocating magnetic shuttle disposed in the fluid chamber and dividing the fluid chamber into a first volume and a second volume, a first conduit connected to the first volume, and a second conduit connected to the second volume. The apparatus also includes at least one switching assembly configured to alternate between a first operating state and a second operating state, where the first conduit is in fluid communication with a first fluid pressure source including fluid having a first pressure and the second conduit is in fluid communication with a second fluid pressure source including fluid having a second pressure when the apparatus is in the first operating state, and the first conduit is in fluid communication with the second fluid pressure source and the second conduit is in fluid communication with the first fluid pressure source when the apparatus is in the second operating state. The switching assembly is configured to alternate between the first operating state and the second operating state to alternate a direction of a differential pressure between the first volume and the second volume and cause the magnetic shuttle to move in a reciprocating motion and generate an electric current in the one or more conductive coils.

An embodiment of a method of generating electrical power includes disposing at least one power generation assembly at a component, the at least one power generation assembly having a fluid chamber configured to exchange or receive a fluid, one or more conductive coils surrounding the fluid chamber, a reciprocating magnetic shuttle disposed in the fluid chamber and dividing the fluid chamber into a first volume and a second volume, a first conduit connected to the first volume, and a second conduit connected to the second volume. The method also includes alternating between a first operating state and a second operating state to alternate a direction of a differential pressure between the first volume and the second volume and cause the magnetic shuttle to move in a reciprocating motion and generate an electric current in the one or more conductive coils. The first conduit is in fluid communication with a first fluid pressure source including fluid having a first pressure and the second conduit is in fluid communication with a second fluid pressure source including fluid having a second pressure when the at least one power generation assembly is in the first operating state, and the first conduit is in fluid communication with the second fluid pressure source and the second conduit is in fluid communication with the first fluid pressure source when the at least one power generation assembly is in the second operating state.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
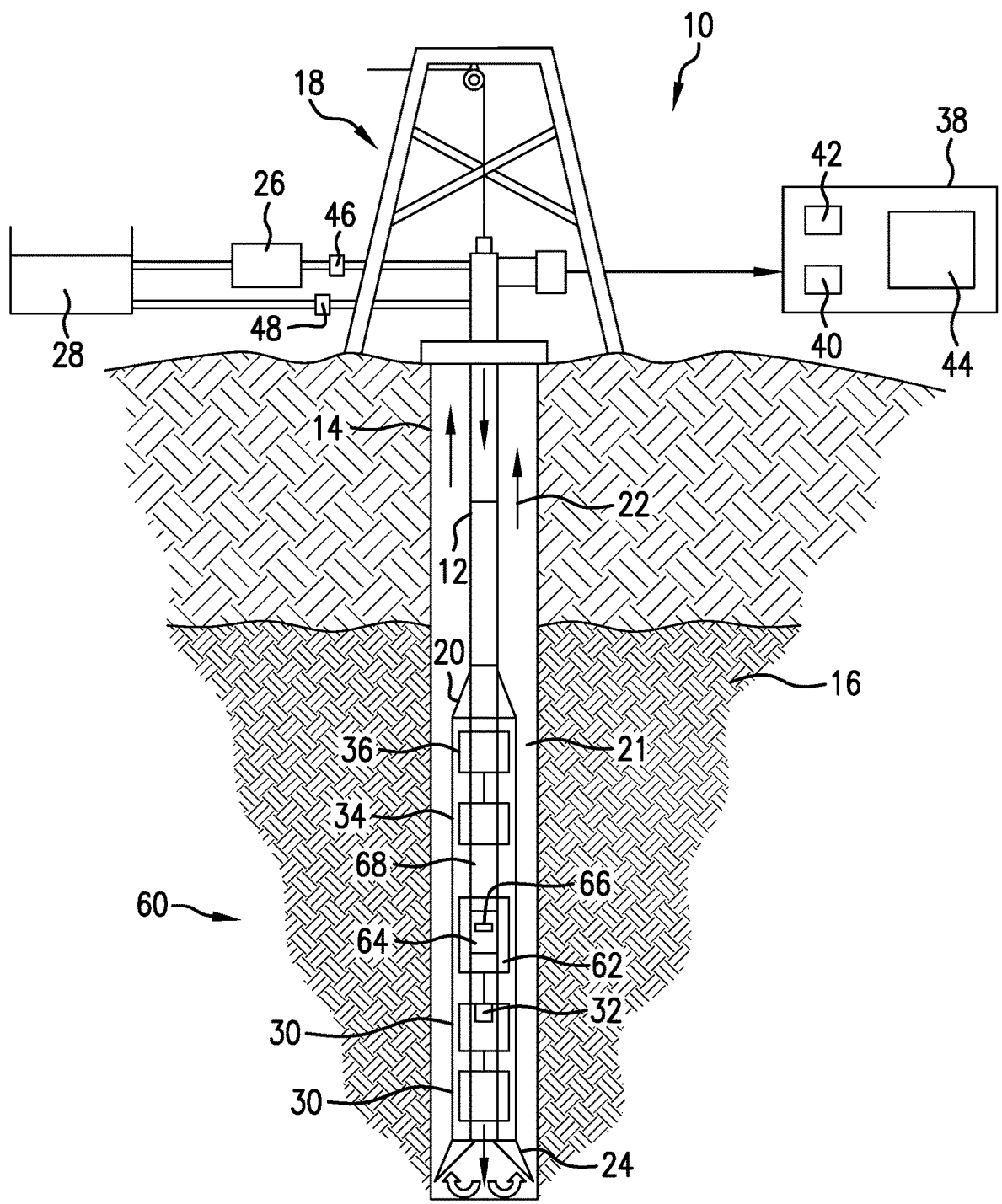
FIG. 1 depicts an embodiment of a system for performing an energy industry operation, the system including an electrical power generation assembly.

A detailed description of one or more embodiments of the disclosed apparatus and method are presented herein by way of exemplification and not limitation with reference to the figures.

Disclosed are apparatuses, systems and methods for generating electrical power in a downhole environment. An embodiment of a power generation assembly is configured to be disposed in a borehole with a tubular (e.g., attached to or integral with a tubular such as a drill pipe segment or a power sub, liner joint, tool mandrel or any other suitable component that can be deployed downhole) and includes a magnetic shuttle disposed in a fluid chamber and moveable between a first end and a second end the fluid chamber. One or more conductive coils are disposed on or at least proximate to the fluid chamber such that at least a portion of the coils are within a magnetic field generated by the magnetic shuttle.

The power generation assembly is in selective fluid communication with a first fluid pressure source that includes fluid having a first pressure, and with a second fluid pressure source that includes fluid having a second pressure. The first pressure and the second pressure are different, and thereby provide a differential pressure that is utilized to move the magnetic shuttle in a reciprocating motion. The first end is selectively connected to the first fluid pressure source or the second fluid pressure source, and the second end is likewise selectively connected to the first fluid pressure source or the second fluid pressure source. A switching assembly is operable to switch the power generation assembly between a first operating state in which the first end is in fluid communication with the first fluid pressure source and the second end is in fluid communication with the second fluid pressure source, and a second operating state in which the first end is in fluid communication with the second fluid pressure source and the second end is in fluid communication with the first fluid pressure source. The switching assembly may be operated to alternate between the first operating state and the second operating state so that the differential pressure is applied in alternating directions. The alternating differential pressure direction causes a reciprocating motion of the magnetic shuttle, which in turn causes electric current in the coils. The electric current can be used for various purposes, such as supplying power to one or more downhole components or charging a storage device.

Embodiments described herein provide a number of advantages and technical effects. Embodiments allow for generation of power in a compact tool or device using existing differential pressures that occur in typical energy industry operations. The embodiments can be utilize to provide power and/or supplement other power sources to increase reliability of power supplies to downhole components. Generating power downhole has been a challenge due to limitations in battery technology, size of equipment, deviated well geometries, and a hazardous environment. Embodiments described herein provide for a relatively simple and compact way to supply power that is effective in downhole environments and can be included in existing downhole systems with relatively small changes in size and complexity.

FIG. 1 shows an embodiment of a system 10 for performing an energy industry operation (e.g., drilling, measurement, stimulation, well construction, well completion and/or production). The system 10 includes a borehole string 12 that is shown disposed in a well or borehole 14 that is drilled to penetrate at least one resource bearing formation 16 during a drilling or other downhole operation. As described herein, "borehole" or "wellbore" refers to a hole that makes up all or part of a drilled well. It is noted that the borehole 14 may include vertical, deviated and/or horizontal sections, and may follow any suitable or desired path. As described herein, "formations" refer to the various features and materials that may be encountered in a subsurface environment and surround the borehole 14.

The borehole string 12 is operably connected to a surface structure or surface equipment such as a drill rig 18, which includes or is connected to various components such as a surface drive or rotary table for supporting the borehole string 12, rotating the borehole string 12 and lowering string sections or other downhole components. In one embodiment, the borehole string 12 is a drill string including one or more drill pipe sections that extend downward into the borehole 14, and is connected to a bottomhole assembly (BHA) 20.

The borehole string 12 includes or forms a tubular through which fluid 22 is circulated into the borehole 14. In operation, in one embodiment, the fluid 22 is injected into the tubular and/or the borehole string 12 by the surface equipment 18, flows through the tubular and returns to the surface through an annulus 21 between the borehole string 12 and the borehole wall (or casing if the borehole or borehole section is cased). The fluid 22 may be any type of fluid, such as drilling fluid or stimulation fluid, and may include formation fluid such as water, gas and/or oil that enters the borehole 14.

For example, the surface equipment 18 includes a drilling rig and the fluid 22 includes drilling mud injected into the tubular to facilitate a drilling and/or measurement (e.g. logging while drilling) operations. The BHA 20 includes a drill bit 24, which in this example is driven from the surface, but may be driven from downhole, e.g., by a downhole mud motor. A pumping device 26 may be located at the surface to circulate the fluid 22 from a mud pit or other fluid source 28 into the borehole 14 as the drill bit 24 is rotated.

In the embodiment of FIG. 1, the system 10 shown is configured to perform a drilling operation, and the borehole string 12 is a drill string. However, embodiments described herein are not so limited and may have any configuration suitable for performing an energy industry operation that includes a downhole power generator. For example, the system 10 may be configured as a stimulation system and/or a completion system, which may include components such as a hydraulic fracturing assembly and/or a production assembly (including, e.g., a production sleeve and a screen).

The system 10 may include one or more of various tools 30 configured to perform selected functions downhole such as performing downhole measurements, facilitating communications, performing stimulation operations and/or performing production operations. For example, one or more of the downhole tools 30 may include one or more sensors 32 for performing measurements such as logging while drilling (LWD) or measurement while drilling (MWD) measurements. Other tools include, e.g. intelligent production tools, liner setting tools, and tools for logging various information while completing construction of a borehole.

In one embodiment, the system 10 includes a telemetry assembly such as a communication module 34 (e.g., a telemetry sub) for communicating with the surface and/or other downhole tools or devices. In one embodiment, the communication module is configured as a mud pulse telemetry (MPT) device including a pulser (not shown) that generates pressure signals through the fluid, but is not so limited. The communication module 34 may be configured to perform any suitable type of wired or wireless communication.

One or more downhole components and/or one or more surface components may be in communication with and/or controlled by a processor such as a downhole processor 36 and/or a surface processing unit 38. In one embodiment, the surface processing unit 38 is configured as a surface control unit which controls various parameters such as rotary speed, weight-on-bit, fluid flow parameters (e.g., pressure and flow rate) and others. The surface processing unit 38 (or other processor) can also perform monitoring and communication functions, e.g., to gather tool status information and information regarding borehole conditions.

The surface processing unit 38 (and/or the downhole processor 36) may be configured to perform functions such as controlling drilling and steering, controlling the flow rate and pressure of borehole fluid, transmitting and receiving data, processing measurement data, and/or monitoring operations of the system 10. The surface processing unit 38, in one embodiment, includes an input/output device 40, a processor 42, and a data storage device 44 (e.g., memory, computer-readable media, etc.) for storing data, models and/or computer programs or software that cause the processor to perform aspects of methods and processes described herein.

Surface and/or downhole sensors or measurement devices may be included in the system 10 for measuring and monitoring aspects of an operation, fluid properties, component characteristics and others. In one embodiment, the surface processing unit 38 and/or the downhole processor 36 includes or is connected to various sensors for measuring fluid flow characteristics. For example, the system 10 includes fluid pressure and/or flow rate sensors 46 and 48 for measuring fluid flow into and out of the borehole 14, respectively. Fluid flow characteristics may also be measured downhole, e.g., via fluid flow rate and/or pressure sensors in the borehole string 12.

Some downhole components, such as the tools 30, the communication module 34 and/or the downhole processor 36, need electrical power to operate. Such power can be transmitted from the surface via a cable, or provided by a downhole power generation system as discussed herein.

The system 10, in one embodiment, includes a downhole power generation assembly 60. The power generation assembly 60 may be incorporated into the borehole string 12 as part of a power generation module or sub, or incorporated as part of a component or tool to supply power to thereto.

The power generation assembly 60 includes a housing 62 that defines or includes a fluid chamber 64. The fluid chamber 64 houses a reciprocating magnetic shuttle 66. The magnetic shuttle 66 is caused to move axially along the fluid chamber past one or more conductive coils (e.g., conductive wire windings) that extend around the fluid chamber 64 and are positioned such that the moving magnetic field of the magnetic shuttle 66 causes electric currents to be induced therein. The magnetic shuttle 66, in one embodiment, is driven in a reciprocating manner by utilizing a pressure differential between a plurality of fluid pressure sources. As discussed further below, in one embodiment, the plurality of fluid pressure sources include a first fluid pressure source that includes fluid having a first pressure and a second fluid source that includes fluid having a second pressure that is different from the first pressure.

A "fluid pressure source" refers to any source or location from which fluid pressure can be applied to the fluid chamber 64. One or more fluid sources can be borehole fluid circulating through the borehole 14, for example, through a borehole string conduit and/or borehole fluid flowing in the annulus 21. Other examples of fluid pressure sources include chambers, cavities or fluid reservoirs disposed in or with the borehole string 12. It is noted that a fluid pressure source may be a single source or location or may include multiple constituent fluid sources, such as one or more fluid chambers.

In one embodiment, the magnetic shuttle 66 divides the fluid chamber 64 into opposing volumes (i.e., a first volume and a second volume) that are selectively and alternatingly connected to the first fluid pressure source or the second fluid pressure source. In a first operating state, the first volume is connected in fluid communication with the first fluid pressure source and the second volume is in fluid communication with the second fluid pressure source. The differential between the volumes causes pressure to be applied in a first direction so that the magnetic shuttle 66 moves in the first direction. Once the magnetic shuttle 66 has moved by the conductive coils, a switching assembly (including, e.g., a series of valves) switches the applied pressure direction to send the magnetic shuttle 66 in a second direction opposite to the first direction. In other words, the switching assembly causes the power generation assembly 60 to switch to a second operating state in which the second volume is connected in fluid communication with the first fluid pressure source and the first volume is in fluid communication with the second fluid pressure source.

The switching assembly alternates between operating states and thereby alternates between applying pressure in the first direction and the second direction, which results in a reciprocating (back-and-forth) movement that creates repeating pulses of electric current at high speed. The electric current can be used to power downhole components such as electrical components and sensors, and/or recharge batteries or other energy storage devices.

Although embodiments are discussed herein in conjunction with an energy industry system or downhole environment, the embodiments are not so limited. The power generation assembly 60 can be disposed at a surface location, and can be disposed with any component or configuration that can be connected to a fluid source, exchanges fluid and/or is coupled to a fluid flow loop.

Figure 2:
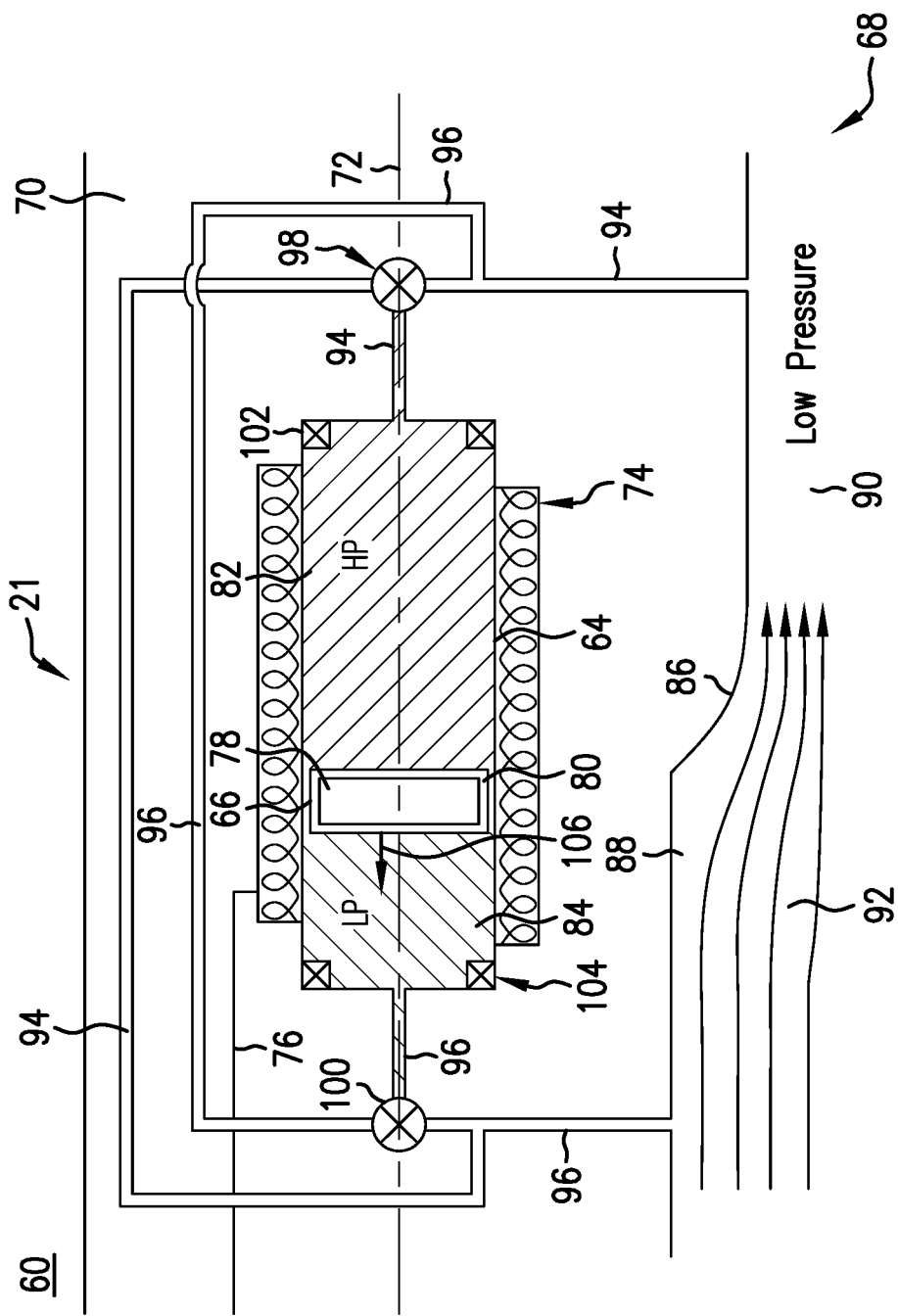
FIG. 2 depicts an embodiment of the power generation assembly of FIG. 1, in an operating state in which a magnetic shuttle is driven in a first direction.
Figure 3:
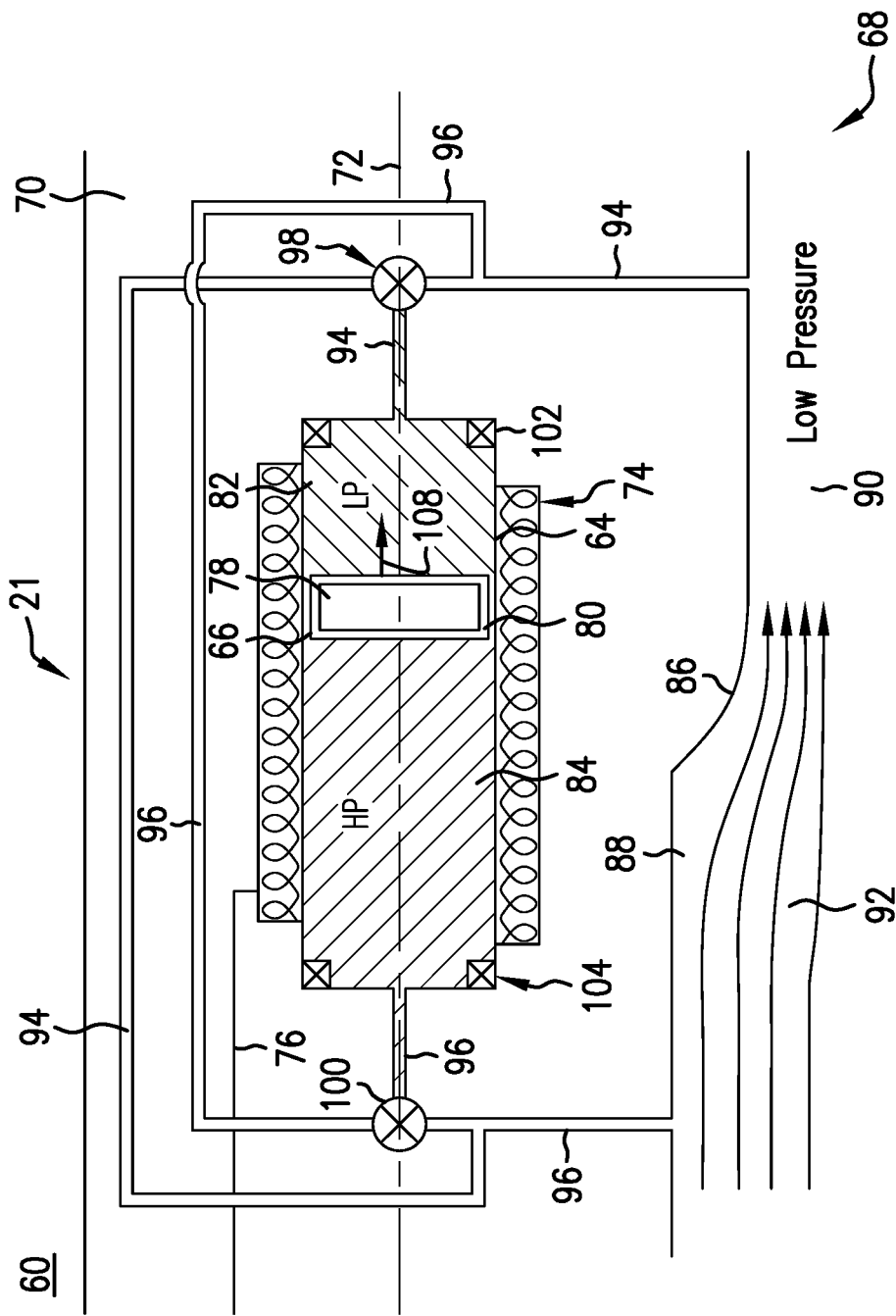
FIG. 3 depicts an embodiment of the power generation assembly of FIGS. 1 and 2, in an operating state in which the magnetic shuttle is driven in a second direction.

FIGS. 2 and 3 depict an embodiment of the power generation assembly 60 and illustrate aspects of operation of the power generation assembly 60 to produce electric power. The power generation assembly 60 includes the fluid chamber 64. In this embodiment, the fluid chamber 64 is disposed between the annulus 21 and a central conduit 68. The central conduit 68 may be a central conduit of the borehole string 12 extending from the surface or may be any other conduit.

For example, the fluid chamber 64 is disposed in a housing, which may be part of or formed in an annular region of a downhole component 70. The annular region may be part of the wall of a tubular, such as a length of drill pipe, part of a downhole component such as a LWD tool, part of a tool joint, or disposed in a dedicated component such as a power supply sub. The fluid chamber 64 is not limited to the annular region, but may be positioned at any suitable location. For example, the power generation assembly 60 or components thereof can be disposed outside of the wall of the downhole component 70 or other tubular. A housing including the fluid chamber 64 and/or conductive coils could be located on an exterior surface of the downhole component 70, a surface of the central conduit 68, or in a recess formed at or near a surface. For example, a housing including the fluid chamber 64 may be attached to a wall of the downhole component 70 (e.g., on an inner surface of the downhole component 70). In the embodiment shown in FIGS. 2 and 3, the housing is integral with the wall. For example, the fluid chamber 64 is a bore or other cavity formed in the wall of the downhole component 70.

In this embodiment, the fluid chamber extends along a primary axis 72. The primary axis 72, as shown, is offset from the central axis of the central conduit 68, however the primary axis 72 can be in-line with the central axis (e.g., with a fluid bypass running around the fluid chamber 64). The magnetic shuttle 66 is allowed to move in directions parallel to the axis 72 due to applied pressure differentials. As noted above, the power generation assembly 60 includes one or more conductive coils 74, in which an electric current is induced by movement of the magnetic shuttle 66. The conductive coils 74 may be connected to an electrical connector 76 to transmit electric power to the downhole component 70 and/or other components.

Although the conductive coils 74 are discussed as being disposed on the outside of the fluid chamber 64, embodiments described herein are not so limited. For example, the conductive coils 74 may be disposed within the fluid chamber 64, with pressure sealed electrical leads extending to the outside of the fluid chamber 64.

The fluid chamber 64 may be of any suitable size and shape that allows the magnetic shuttle 66 to move in opposing directions. For example, the fluid chamber 64 is a cylindrical chamber having a longitudinal axis that corresponds to the axis 72, and has a cylindrical magnetic shuttle shaped and sized to maintain a selected clearance between the magnetic shuttle 66 and the interior surfaces of the fluid chamber 64. The clearance is selected to prevent a significant amount of fluid from passing between the opposing volumes in the fluid chamber, or otherwise form a restriction between opposing volumes of the fluid chamber 64 that is sufficient to create a sufficient pressure differential.

The magnetic shuttle 66 includes or is formed by a magnetic component such as a permanent magnet 78 (although the magnetic component may be a temporary magnet). The magnetic shuttle 66 may be made entirely of the permanent magnet 78, or include additional components such as a shuttle housing 80. In addition, the magnetic shuttle 66 and/or the fluid chamber 64 may include other components to facilitate operation, such as one or more bearings, one or more bushings and/or one or more seals. For example, the magnetic shuttle 66 may be surrounded by an o-ring or other suitable type of seal to prevent fluid bypass while the magnetic shuttle 66 is moving axially.

The magnetic shuttle 66 divides the fluid chamber 64 into opposing volumes, i.e., a first volume 82 that extends from one end of the fluid chamber 64 to the magnetic shuttle 66, and a second volume 84 that extends from an opposite end of the fluid chamber 64 to the magnetic shuttle 66.

As noted above, the first volume 82 and the second volume 84 are selectively connected to a first fluid pressure source and a second fluid pressure source. In the embodiment of FIGS. 2 and 3, the first and second fluid pressure sources are sections or lengths of the central conduit 68. It is noted that various embodiments are described herein as having features (including the first volume 82 and the second volume 84) connected or in operable relation to the central conduit 68. It is to be understood that such features may be similarly connected to any fluid conduit or fluid source and are not limited to connection to the central conduit 68.

In one embodiment, the central conduit 68 includes a constricted section or restriction formed or included therein. For example, the central conduit includes a restriction 86 that reduces the diameter or size of the central conduit 68 and establishes a first conduit length or section 88 upstream from the restriction 86 and a second conduit length or section 90 downstream of the restriction 86. The restriction 86 produces a pressure differential due to the venturi effect between the first section 88 and the second section 90. A fluid 92 such as drilling mud or other fluid flows through the restriction 86, and increases in velocity and decreases in pressure. Accordingly, the first section 88 constitutes a first fluid pressure source in which fluid has a first pressure (referred to herein as a high pressure) and the second section 90 constitutes a second fluid pressure source in which fluid has a second, lower pressure (referred to herein as a low pressure). It is noted that designations of "high" and "low" are provided to indicate relative pressure levels and are not intended to denote any particular pressure.

The power generation assembly 60 includes at least one first port or conduit 94 that is connected to both the first section 88 and the second section 90, and at least one second port or conduit 96 that is connected to both the first section 88 and the second section 90. The first conduit 94 is also connected to the first volume 82 via a first valve 98, which acts to selectively connect either the first section 88 or the second section 90 in fluid communication with the first volume 82. Likewise, the second conduit 96 is connected to the second volume 84 via a second valve 100, which acts to selectively connect either the first section 88 or the second section 90 in fluid communication with the second volume 84.

By connecting a high pressure flow from the first section 88 to the first volume 82 and a low pressure flow from the second section 90 to the second volume 84, the magnetic shuttle 66 is driven in a first direction. Switching the high pressure flow to the second volume 84 and the low pressure flow to the first volume 82 using the valves 98 and 100 (e.g., by simultaneously controlling the valves 98 and 100 to switch direction) drives the magnetic shuttle 66 in a second, opposite direction. Switching in an alternating fashion causes the magnetic shuttle 66 to alternate between the first and second directions, resulting in alternating electric currents in the conductive coils 74.

In one embodiment, the power generation assembly 60 includes a switching assembly configured to operate the valves 98 and 100 to switch between applied differential pressure directions. For example, the switching assembly includes a first switch 102 and a second switch 104. Each of the switching devices in this example are toroidal switches that are actuated by hydraulic pressure, mechanical contact with the magnetic shuttle 66, proximity to the magnetic shuttle 66, by active control (e.g., electrical signals or commands) or by any other suitable means.

In one embodiment, the switching assembly omits the switches 102 and 104 and directly actuates the valves 98 and 100. For example, each valve 98 and 100 can be a hydraulically actuated valve that switches between high and low pressure flow.

The switching devices may be of any suitable type. For example, the switches 102 and 104 may be mechanically operated switches that actuate the valves 98 and 100 to switch between a high pressure flow and a low pressure flow. A "high pressure flow" refers to fluid being permitted by a valve to flow from the first section 88 (or other high pressure fluid source) to a fluid chamber volume, and fluid being prevented by the valve from flowing into the fluid chamber volume from the second section 90 (or other low pressure fluid source). A "low pressure flow" refers to fluid being permitted by a valve to flow between the second section 90 (or other low pressure fluid source) and a fluid chamber volume, and fluid being prevented by the valve from flowing into the fluid chamber volume from the first section 88 (or other high pressure fluid source). In the operating state shown in FIG. 2, high pressure flow from the first section 88 is in fluid communication with the first volume 82, and low pressure flow from the second section 90 is in fluid communication with the second volume 84.

In another example, the switches 102 and 104 can be magnetically actuated switches that actuate the valves 98 and 100 in response to the magnetic field of the magnetic shuttle 66 when the magnetic shuttle 66 advances to a location proximate to a switch. In a further example, the switches 102 and 104 can be pressure switches configured to actuate the valves 98 and 100 by an increase in pressure as the magnetic shuttle 66 is driven toward a switch.

Other components may be included to facilitate movement of the magnetic shuttle, such as springs located at opposing ends of the fluid chamber 64. The springs may be used to apply energy to the magnetic shuttle 66 and/or to actuate the switches 102 and 104.

In one embodiment, some of the electric power generated by the reciprocating movement of the magnetic shuttle 66 is utilized to operate components of the switching assembly and/or the power generation assembly 60. Various components can be included to operate the switches 102 and 104 and/or facilitate movement of the magnetic shuttle 66. For example, the switches 102 and 104 can be electrically actuated switches that simultaneously are actuated to control the valves 98 and 100 to switch the direction of the differential pressure in the fluid chamber 64. In another example, piezoelectric springs can be actuated via the switches 102 and 104 or otherwise actuated to increase the movement speed or acceleration of the magnetic shuttle 66, or otherwise enhance the overall amount of generated electricity.

Operation of the switches and other components of the power generation assembly 60 can be controlled by a controller or other processing device disposed with the power generation assembly (e.g., as part of a power generation sub or module) or disposed remotely at a surface or downhole location. For example, the connector 76 is utilized to transmit data and/or commands from a controller to operate switches or springs.

FIGS. 2 and 3 illustrate operating states of the power generation assembly 60 during operation and generation of electric power. FIG. 2 shows a first operating state, in which the first volume 84 is in fluid communication with high pressure fluid 92 from the first section 88 of the tubular conduit 68, and the second volume 82 is in fluid communication with low pressure fluid 92 from the second section 90 of the tubular conduit 68. As noted above, "high pressure" and "low pressure" are intended to be relative terms and are not indicative of a specific pressure value.

In the first operating state, the pressure differential drives the magnetic shuttle 66 in a first direction 106 axially away from a first end of the fluid chamber 64 toward a second end of the fluid chamber 64. When the magnetic shuttle 66 contacts or is proximate to the second switch 104, or in response to a signal or command, both the first switch 102 and the second switch 104 are operated to control the first valve 98 and the second valve 100 to change the direction of the differential pressure and put the power generation assembly 60 in a second operating state. In one embodiment, the first and second switches 102 and 104 are operated at least substantially simultaneously.

As shown in FIG. 3, when the power generation assembly 60 is in the second operating state, the first volume 82 is in fluid communication with low pressure fluid from the second section 90, and the second volume 84 is in fluid communication with high pressure fluid from the first section 88. When in this state, the magnetic shuttle 66 is driven toward the first end in a second direction 108. The valves are again operated to switch the assembly to the first operating state.

The valves are operated to alternately switch between the first and second operating states. In this way, reciprocal motion of the magnetic shuttle 66 is realized, and an alternating current is generated in the conductive coils 74.

Figure 4:
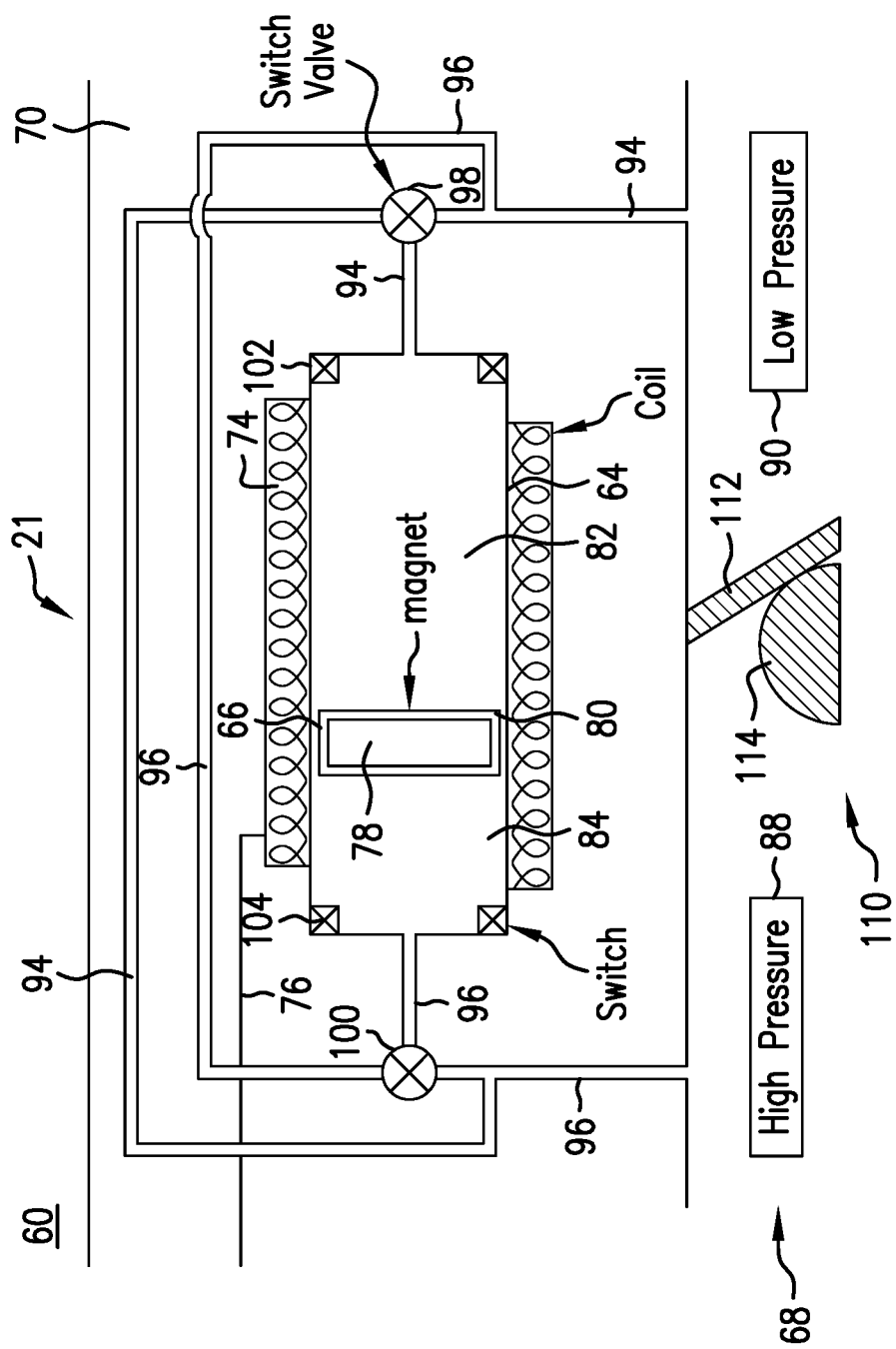
FIG. 4 depicts an embodiment of the power generation assembly of FIG. 1, including a seating assembly configured to create a differential pressure used to cause reciprocating movement of a magnetic shuttle.
Figure 5:
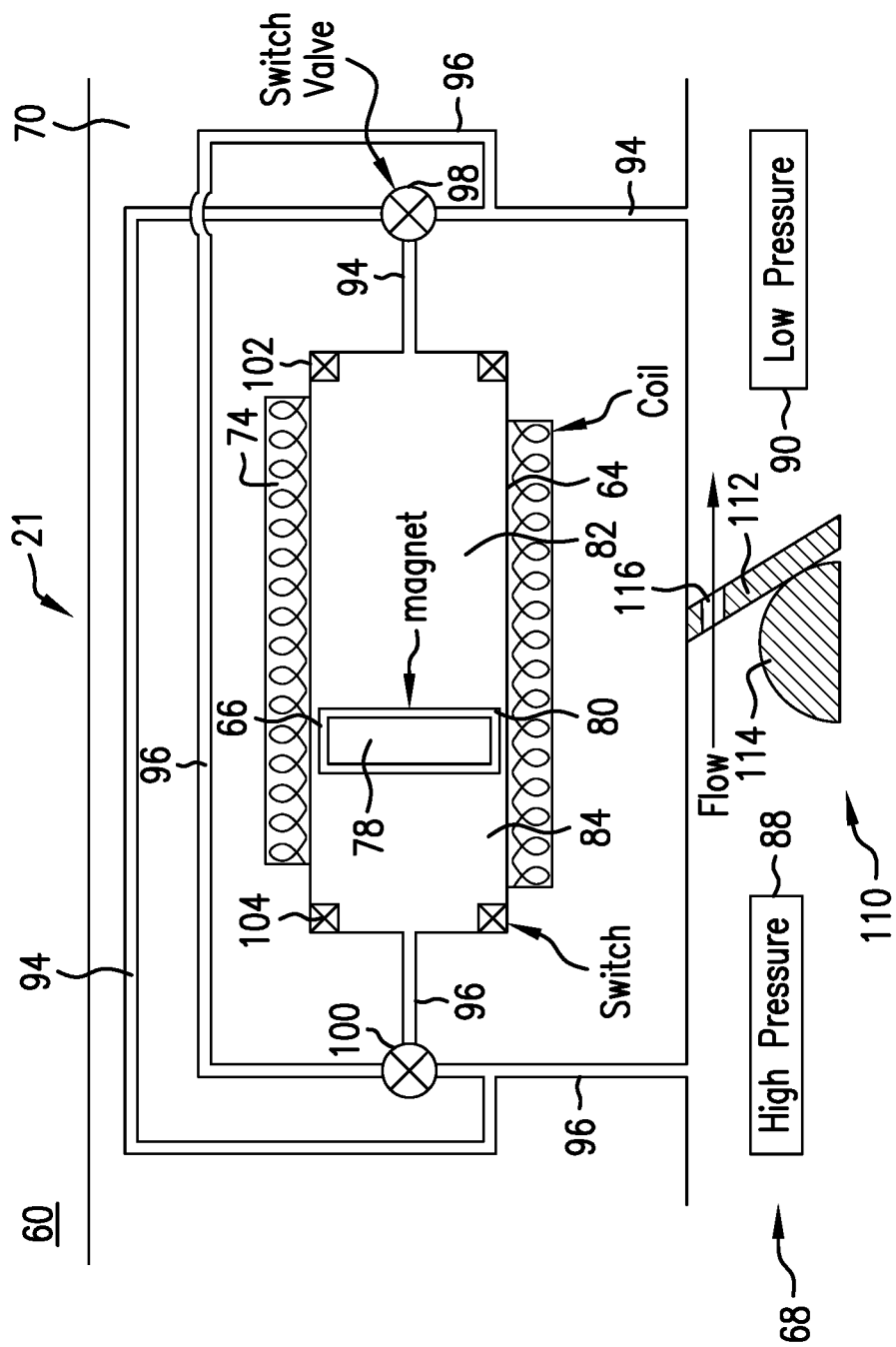
FIG. 5 depicts an embodiment of the power generation assembly of FIG. 1, including a seating configured to create a differential pressure.

FIGS. 4 and 5 illustrate embodiments of the power generation assembly 60 that employ a seating assembly to establish first and second fluid pressure sources. In one embodiment, shown in FIG. 4, the power generation assembly 60 includes or uses a seating assembly 110 that includes a landing seat 112 fixedly disposed relative to the central conduit 68. As described herein, a landing seat is a configuration that forms a restricted portion of a fluid conduit or a component that extends into the fluid conduit in order to receive a deployable object and at least temporarily prevent the deployable object from moving. The deployable object may be a ball, dart or other object that is deployed into the borehole string 12 by dropping and/or advancing the object by fluid pressure. For example, as shown in FIGS. 4 and 5, the landing seat 112 is a ball seat that receives a ball 114 that is deployed into the borehole string 12.

When the deployable object is seated on the landing seat, fluid flow through the seating assembly 110 is restricted or prevented entirely. As a result, pressure in the first section 88 upstream of the seating assembly 110 increases, resulting in a pressure differential between the first section 88 and the second section 90.

The seating assembly 110, when actuated by deploying the ball 114 or other deployable object, either fully or partially restricts fluid flow through the central conduit 68. For example, in the embodiment of FIG. 4, the seating assembly 110 is configured to substantially completely prevent fluid flow therethrough.

In one embodiment, the seating assembly 110, power generation assembly 60 and/or downhole component 70 include one or more features configured to permit a selected amount of fluid to traverse the seating assembly 110. For example, as shown in FIG. 5, a bypass conduit 116 is formed in the landing seat 112, which may have any suitable size to permit a selected rate of fluid flow through the landing seat. The bypass conduit 116 can be located at any suitable location and have any suitable dimensions (e.g., length and diameter). For example, the bypass conduit 116 can be formed or configured as part of the landing seat 112 and/or part of the downhole component (e.g., in the wall of the downhole component). The dimensions of the bypass conduit 116 may be selected so that a selected pressure differential is realized.

In the above embodiments, fluid pressure is transmitted by allowing borehole fluid (or other selected fluid) to flow directly into the fluid chamber 64. However, the embodiments described herein are not so limited. In one embodiment, the fluid chamber 64 may be filled with a different fluid that is acted upon by pressure from the annulus and the tubular conduit.

Figure 6:
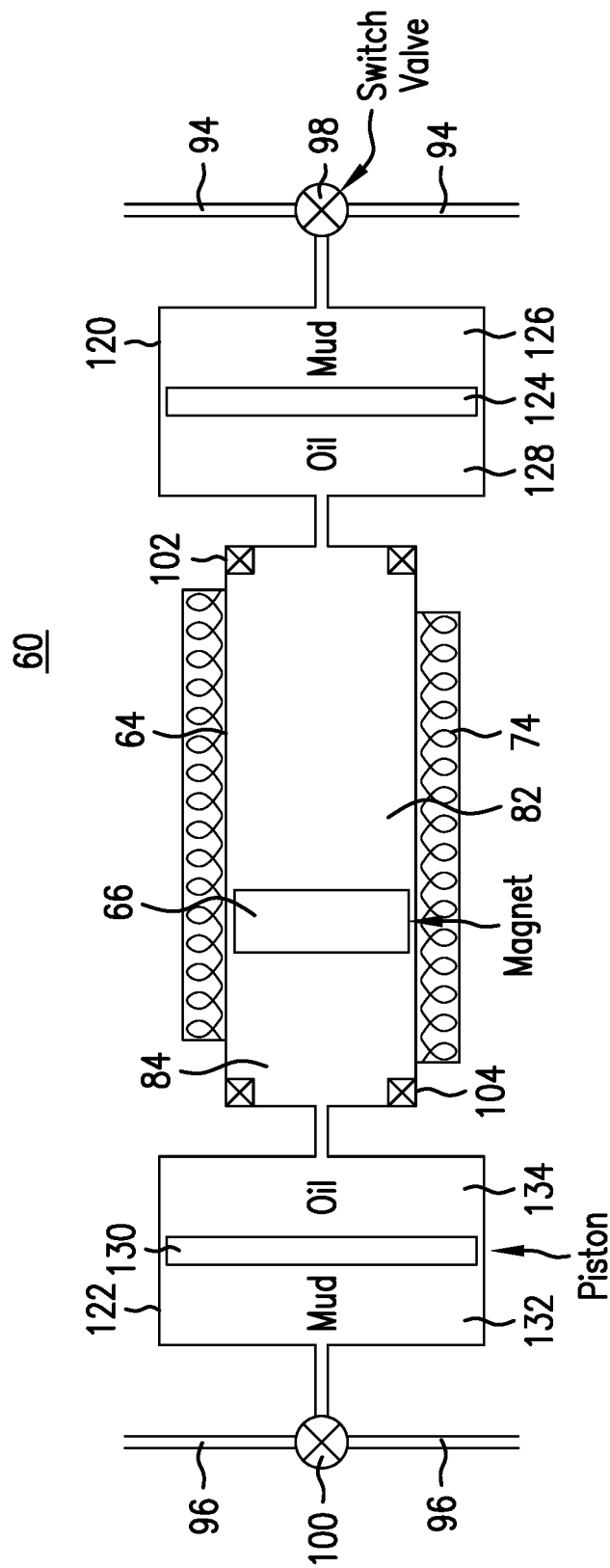
FIG. 6 depicts an embodiment of the power generation assembly of FIG. 1.

An example of the power generation assembly 60 that incorporates indirect pressure transmission is shown in FIG. 6. This example of the power generation assembly 60 is similar to the above embodiments, except that instead of borehole fluid entering the fluid chamber 64, fluid pressure is applied to a hydraulic fluid in the fluid chamber 64.

For example, the power generation assembly 60 includes secondary fluid chambers 120 and 122 in fluid communication with the first volume 82 and the second volume 84, respectively. One secondary fluid chamber 120 includes a moveable pressure piston 124 that separates the secondary fluid chamber into a first region 126 in fluid communication with borehole fluid (either fluid from a first fluid pressure source or a second fluid pressure source depending on the position of the first valve 98), and a second region 128 in fluid communication with the fluid chamber 64. Likewise, another secondary fluid chamber 122 includes a moveable pressure piston 130 that separates the secondary fluid chamber 122 into a first region 132 in fluid communication with borehole fluid, and a second region 134 in fluid communication with the fluid chamber 64.

In this example, the fluid chamber 64 and the regions 128 and 134 are filled with a hydraulic fluid such as oil. It is noted that any suitable fluid may be used in the fluid chamber 64 and is not limited to the above example. The use of indirect power transmission can serve various functions, such as preventing ingress of cuttings, sand, particles and other materials in borehole fluid that could potentially reduce operating efficiency and/or performance. For example, in some embodiments, the first conduit 94 and/or the second conduit 96 can have any number of constituent conduits. Such conduits may be of any size, and can be of a small size (e.g., as micro-conduits). Small conduits can be susceptible to clogging; indirect pressure transmission as described herein can be used to prevent or minimize the occurrence of clogging.

Figure 7:
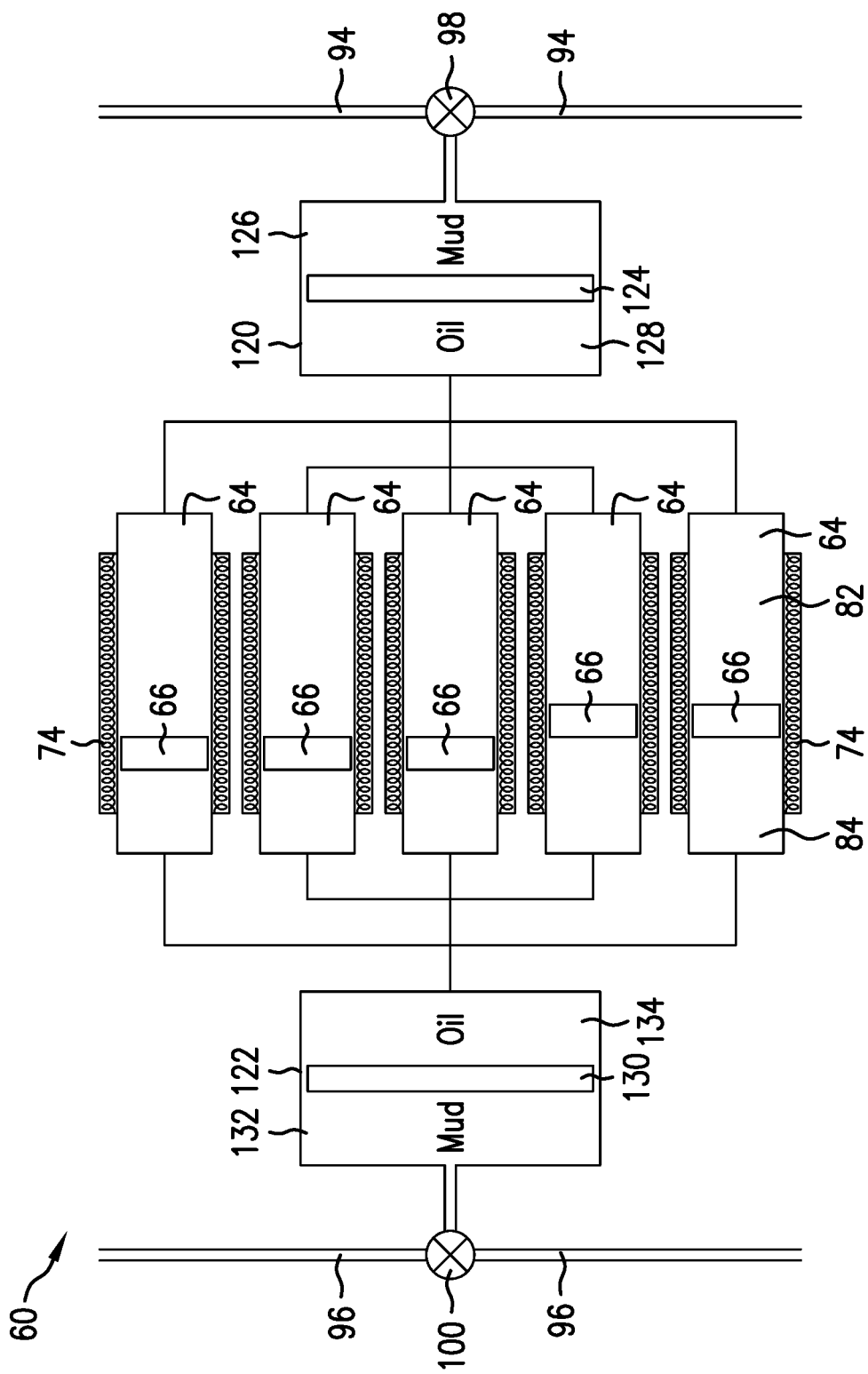
FIG. 7 depicts an embodiment of the power generation assembly of FIG. 1, which includes a plurality of magnet assemblies.

Multiple power generation assemblies 60 and/or fluid chambers 64 can be operated in parallel or otherwise in combination to increase electrical output. For example, as shown in FIG. 7, a plurality of magnet assemblies are connected to the conduits 94 and 96. Each magnet assembly includes a respective housing, fluid chamber 64, conductive coils 74 and magnetic shuttle 66. In one embodiment, the magnet assemblies are operated simultaneously as the switching assemblies alternatingly switch the direction of the pressure differential in each fluid chamber 64.

Although the fluid chambers (and the movement direction of the magnetic shuttle) are shown as generally parallel to one another, they are not so limited. Furthermore, the fluid chambers and the direction of movement of magnetic shuttles are not limited to any particular direction or path. For example, the movement direction may be independent of the configuration of the tubular and can be a non-linear direction. In another example, multiple fluid chambers can be arrayed circumferentially around the tubular conduit 68. In a further example, the fluid chamber defines a curved path that follows a circumferential direction around the central conduit 68. The fluid chamber may extend completely around the central conduit 68, or extend partially and define an arc path that forms part of the circumference around the tubular conduit.

Other downhole conditions can be utilized to induce or facilitate reciprocal movement of the magnetic shuttle 66. For example, vibration can be utilized to cause reciprocating movement and/or enhance the movement caused by the switching assembly. The vibration may be naturally occurring vibration of the borehole string 12 and/or vibration from a vibrating (e.g., piezoelectric) component attached to the borehole string 12 and/or the magnet assembly. In one embodiment, the switches and/or valves can be operated to switch between operating states at a frequency that corresponds to frequencies of induced and/or naturally occurring vibrations.

Figure 8:
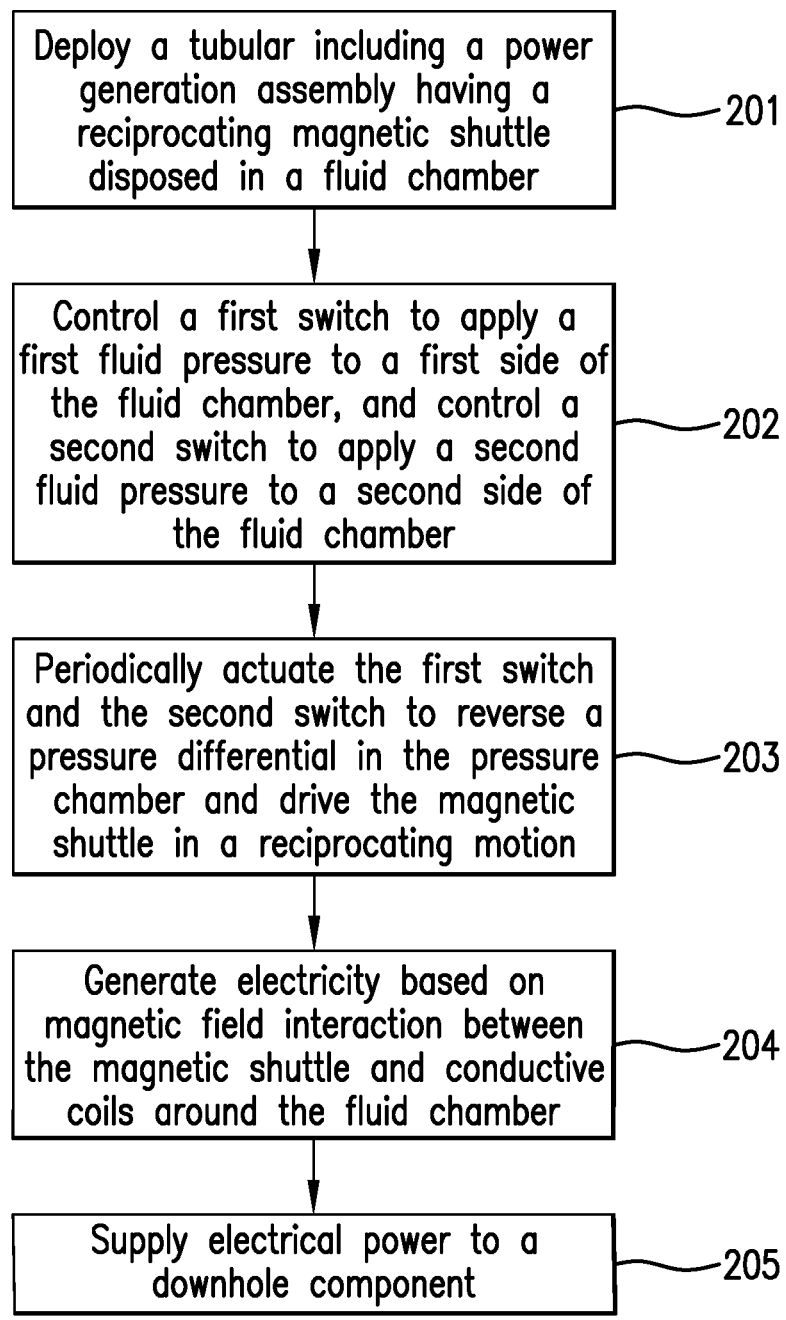
FIG. 8 is a flow chart for a method for generating electrical power in a downhole environment.

FIG. 8 illustrates a method 200 of performing an energy industry operation and generating power for one or more downhole components. The method 200 may be used in conjunction with the system 10, although the method 200 may be utilized in conjunction with any suitable type of device or system for which downhole electrical power is desired. The method 200 includes one or more stages 201-205. In one embodiment, the method 200 includes the execution of all of stages 201-205 in the order described. However, certain stages may be omitted, additional stages may be added, and/or the order of the stages may be changed.

Aspects of the method 200 may be performed by a processing device such as the downhole processor and/or the surface processing unit 38. For example, a processing device may be connected to a power generation assembly to control the switching assembly.

In the first stage 201, a tubular such as the drill string 12 is deployed and the borehole 14 is drilled to a desired location or depth. During drilling, borehole fluid 22 is pumped through the drill string 12 and the BHA 20.

In one embodiment, the first stage 201 includes configuring a power generation assembly 60 or component connected to the power generation assembly 60 to establish or create a first fluid pressure source and/or a second fluid pressure source. For example, if the power generation assembly 60 includes the seating assembly 110, a deployable object such as the ball 114 is deployed and landed on the landing seat 112 to create a differential pressure.

It is noted that, in some instances, it may be desired to re-establish full fluid flow through the borehole string 12 after operation of the power generation assembly 60. Thus, in one embodiment, the seating assembly 110 is configured so that the deployable object can be released and allowed to travel downstream of the landing seat 112. For example, the landing seat 112 and/or the ball 114 can be configured to degrade over a selected time frame. In another example, the landing seat 112 may be extrudable or deformable such that a sufficient increase in fluid pressure applied to the ball 114 forces the ball 114 through the landing seat 112. In a further example, the ball 114 can be deformable such that sufficient pressure causes the ball 114 to deform and pass through the landing seat 112.

In the second stage 202, the power generation assembly 60 is configured in an initial state in which the first volume 82 is in fluid communication with the section 90 (also referred to as the low pressure section 90) so that fluid in the low pressure section 90 applies fluid pressure to the first volume 82, and in which the second volume 84 is in fluid communication with the section 88 (also referred to as the high pressure section 88) so that fluid in the high pressure section 88 applies fluid pressure to the second volume 84. The resulting differential pressure urges the magnetic shuttle 66 toward the first end of the fluid chamber 64.

In the third stage 203, the first switch 102 and the second switch 104 are periodically actuated to alternate between a first operating state and a second operating state to generate reciprocal motion of the magnetic shuttle 66. For example, the switches 102 and 104 are alternatingly actuated to so that the direction of the pressure differential in the fluid chamber 64 is repeatedly reversed. This causes the magnetic shuttle 66 move back and forth in a reciprocating motion.

In the fourth stage 204, the reciprocating motion of the magnetic shuttle 66 causes an alternating current to be generated in the one or more conductive coils 74.

In the fifth stage 205, electrical power is supplied by the power generation assembly 60 to one or more surface or downhole components. For example, the power generation assembly 60 is electrically connected to a downhole tool 30, sensor 32 and/or other downhole component to supply power thereto. In another example, the power generation assembly 60 is connected to a battery or other energy storage device and supplies electric current to charge the storage device.

Set forth below are some embodiments of the foregoing disclosure:

Embodiment 1: An apparatus for generating electrical power, the apparatus comprising: at least one power generation assembly including: a housing including a fluid chamber configured to exchange or receive a fluid; one or more conductive coils surrounding the fluid chamber; and a reciprocating magnetic shuttle disposed in the fluid chamber and dividing the fluid chamber into a first volume and a second volume; a first conduit connected to the first volume, and a second conduit connected to the second volume; and at least one switching assembly configured to alternate between a first operating state and a second operating state, wherein the first conduit is in fluid communication with a first fluid pressure source including fluid having a first pressure and the second conduit is in fluid communication with a second fluid pressure source including fluid having a second pressure when the apparatus is in the first operating state, and the first conduit is in fluid communication with the second fluid pressure source and the second conduit is in fluid communication with the first fluid pressure source when the apparatus is in the second operating state; wherein the switching assembly is configured to alternate between the first operating state and the second operating state to alternate a direction of a differential pressure between the first volume and the second volume and cause the magnetic shuttle to move in a reciprocating motion and generate an electric current in the one or more conductive coils.

Embodiment 2: The apparatus of any prior embodiment, further comprising an electrical connector configured to supply electrical power to a component from the one or more conductive coils.

Embodiment 3: The apparatus of any prior embodiment, wherein the at least one switching assembly includes a first valve disposed in the first conduit and a second valve disposed in the second conduit, the first valve and the second valve operable to switch between the first operating state and the second operating state.

Embodiment 4: The apparatus of any prior embodiment, wherein the housing is located at a downhole component configured to be disposed in a borehole in a resource bearing formation, the downhole component including a tubular conduit through which a borehole fluid is circulated.

Embodiment 5: The apparatus of any prior embodiment, wherein a length of the tubular conduit forms a restriction, the first fluid pressure source is the borehole fluid upstream of the restriction, and the second fluid pressure source is the borehole fluid downstream of the restriction Embodiment 6: The apparatus of any prior embodiment, further comprising a landing seat disposed in the tubular conduit, the landing seat configured to receive an object deployed into a borehole string, wherein the object causes a pressure differential between a section upstream of the landing seat and a section downstream of the landing seat when the object is seated.

Embodiment 7: The apparatus of any prior embodiment, further comprising a bypass conduit configured to allow part of the borehole fluid to flow between the upstream section and the downstream section.

Embodiment 8: The apparatus of any prior embodiment, further comprising at least one switching device configured to control the first valve and the second valve.

Embodiment 9: The apparatus of any prior embodiment, wherein the at least one switching device is configured to operate the first valve and the second valve to switch between the first operating state and the second operating state in response to a periodic signal or command.

Embodiment 10: The apparatus of any prior embodiment, wherein the at least one switching device includes a first switching device configured to control the first valve and a second switching device configured to control the second valve.

Embodiment 11: The apparatus of any prior embodiment, wherein the first switching device and the second switching device are configured to be actuated based on an interaction between the first switching device or the second switching device and the magnetic shuttle.

Embodiment 12: The apparatus of any prior embodiment, wherein the first switching device and the second switching device are configured to be actuated based on at least one of: the magnetic shuttle being in mechanical contact with the first switching device and the second switching device; the magnetic shuttle being in electrical contact with the first switching device and the second switching device; and the magnetic shuttle having a change in proximity to the first switching device or the second switching device.

Embodiment 13: A method of generating electrical power, the method comprising: disposing at least one power generation assembly at a component, the at least one power generation assembly having a fluid chamber configured to exchange or receive a fluid, one or more conductive coils surrounding the fluid chamber, a reciprocating magnetic shuttle disposed in the fluid chamber and dividing the fluid chamber into a first volume and a second volume, a first conduit connected to the first volume, and a second conduit connected to the second volume; and alternating between a first operating state and a second operating state to alternate a direction of a differential pressure between the first volume and the second volume and cause the magnetic shuttle to move in a reciprocating motion and generate an electric current in the one or more conductive coils, wherein the first conduit is in fluid communication with a first fluid pressure source including fluid having a first pressure and the second conduit is in fluid communication with a second fluid pressure source including fluid having a second pressure when the at least one power generation assembly is in the first operating state, and the first conduit is in fluid communication with the second fluid pressure source and the second conduit is in fluid communication with the first fluid pressure source when the at least one power generation assembly is in the second operating state.

Embodiment 14: The method of any prior embodiment, wherein the at least one power generation assembly includes an electrical connector configured to supply electrical power to a component from the one or more conductive coils.

Embodiment 15: The method of any prior embodiment, wherein the at least one power generation assembly includes a first valve disposed in the first conduit and a second valve disposed in the second conduit, the first valve and the second valve operable to switch between the first operating state and the second operating state.

Embodiment 16: The method of any prior embodiment, wherein the component is a downhole component configured to be disposed in a borehole in a resource bearing formation, the downhole component including a tubular conduit through which a borehole fluid is circulated.

Embodiment 17: The method of any prior embodiment, wherein a length of the tubular conduit forms a restriction, the first fluid pressure source is the borehole fluid upstream of the restriction, and the second fluid pressure source is the borehole fluid downstream of the restriction.

Embodiment 18: The method of any prior embodiment, wherein the at least one power generation assembly includes a landing seat disposed in the tubular conduit, and the method further comprises establishing the first fluid pressure source and the second fluid pressure source by deploying an object in a borehole string and seating the object on the landing seat to cause a pressure differential between a section upstream of the landing seat and a section downstream of the landing seat when the object is seated.

Embodiment 19: The method of any prior embodiment, wherein the at least one power generation assembly includes a bypass conduit configured to allow part of the borehole fluid to flow between the upstream section and the downstream section.

Embodiment 20: The method of any prior embodiment, wherein the at least one power generation assembly includes at least one switching device configured to control the first valve and the second valve, and alternating between the first operating state and the second operating state includes operating the first valve and the second valve to switch between the first operating state and the second operating state in response to at least one of: a periodic signal or command, and an interaction between the first switching device or the second switching device and the magnetic shuttle.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An apparatus for generating electrical power, the apparatus comprising:
    at least one power generation assembly including:
        a housing including a fluid chamber configured to exchange or receive a fluid;
        one or more conductive coils surrounding the fluid chamber; and
        a reciprocating magnetic shuttle disposed in the fluid chamber and dividing the fluid chamber into a first volume and a second volume;
    a first conduit connected to the first volume, and a second conduit connected to the second volume, the first conduit and the second conduit in fluid communication with a tubular conduit through which a borehole fluid is circulated, the tubular conduit configured to receive an object deployed with the borehole fluid at a location in the tubular conduit, the object causing a pressure differential between a section upstream of the object and a section downstream of the object; and
    at least one switching assembly configured to alternate between a first operating state and a second operating state, wherein the first conduit is in fluid communication with a first fluid pressure source including fluid having a first pressure, and the second conduit is in fluid communication with a second fluid pressure source including fluid having a second pressure when the apparatus is in the first operating state, and the first conduit is in fluid communication with the second fluid pressure source and the second conduit is in fluid communication with the first fluid pressure source when the apparatus is in the second operating state, wherein the first fluid pressure source includes the section upstream of the object and the second fluid pressure source includes the section downstream of the object;
    wherein the switching assembly is configured to alternate between the first operating state and the second operating state to alternate a direction of a differential pressure between the first volume and the second volume and cause the magnetic shuttle to move in a reciprocating motion and generate an electric current in the one or more conductive coils.

2. The apparatus of claim 1, further comprising an electrical connector configured to supply electrical power to a component from the one or more conductive coils.

3. The apparatus of claim 1, wherein the at least one switching assembly includes a first valve disposed in the first conduit and a second valve disposed in the second conduit, the first valve and the second valve operable to switch between the first operating state and the second operating state.

4. The apparatus of claim 3, further comprising at least one switching device configured to control the first valve and the second valve.

5. The apparatus of claim 4, wherein the at least one switching device is configured to operate the first valve and the second valve to switch between the first operating state and the second operating state in response to a periodic signal or command.

6. The apparatus of claim 3, wherein the at least one switching device includes a first switching device configured to control the first valve and a second switching device configured to control the second valve.

7. The apparatus of claim 1, wherein the housing is located at a downhole component configured to be disposed in a borehole in a resource bearing formation.

8. The apparatus of claim 7, wherein a length of the tubular conduit forms a restriction, the first fluid pressure source is the borehole fluid upstream of the restriction, and the second fluid pressure source is the borehole fluid downstream of the restriction.

9. The apparatus of claim 7, further comprising a landing seat disposed in the tubular conduit, the landing seat configured to receive the object deployed into a borehole string, wherein the object causes the pressure differential between the section upstream of the landing seat and the section downstream of the landing seat when the object is seated.

10. The apparatus of claim 9, further comprising a bypass conduit configured to allow part of the borehole fluid to flow between the upstream section and the downstream section.

11. The apparatus of claim 10, wherein the first switching device and the second switching device are configured to be actuated based on an interaction between the first switching device or the second switching device and the magnetic shuttle.

12. The apparatus of claim 11, wherein the first switching device and the second switching device are configured to be actuated based on at least one of:
    the magnetic shuttle being in mechanical contact with the first switching device and the second switching device;

the magnetic shuttle being in electrical contact with the first switching device and the second switching device; and the magnetic shuttle having a change in proximity to the first switching device or the second switching device.

13. A method of generating electrical power, the method comprising:

disposing at least one power generation assembly at a component, the at least one power generation assembly having a fluid chamber configured to exchange or receive a fluid, one or more conductive coils surrounding the fluid chamber, a reciprocating magnetic shuttle disposed in the fluid chamber and dividing the fluid chamber into a first volume and a second volume, a first conduit connected to the first volume, and a second conduit connected to the second volume, the first conduit and the second conduit in fluid communication with a tubular conduit through which a borehole fluid is circulated, the tubular conduit configured to receive an object deployed with the borehole fluid at a location in the tubular conduit, the object causing a pressure differential between a section upstream of the object and a section downstream of the object; and alternating between a first operating state and a second operating state to alternate a direction of a differential pressure between the first volume and the second volume and cause the magnetic shuttle to move in a reciprocating motion and generate an electric current in the one or more conductive coils, wherein the first conduit is in fluid communication with a first fluid pressure source including fluid having a first pressure and the second conduit is in fluid communication with a second fluid pressure source including fluid having a second pressure when the at least one power generation assembly is in the first operating state, and the first conduit is in fluid communication with the second fluid pressure source and the second conduit is in fluid communication with the first fluid pressure source when the at least one power generation assembly is in the second operating state, wherein the first fluid pressure source includes the section upstream of the object and the second fluid pressure source includes the section downstream of the object.

14. The method of claim 13, wherein the at least one power generation assembly includes an electrical connector configured to supply electrical power to a component from the one or more conductive coils.

15. The method of claim 13, wherein the at least one power generation assembly includes a first valve disposed in the first conduit and a second valve disposed in the second conduit, the first valve and the second valve operable to switch between the first operating state and the second operating state.

16. The method of claim 15, wherein the at least one power generation assembly includes at least one switching device configured to control the first valve and the second valve, and alternating between the first operating state and the second operating state includes operating the first valve and the second valve to switch between the first operating state and the second operating state in response to at least one of: a periodic signal or command, and an interaction between the at least one switching device or the second switching device and the magnetic shuttle.

17. The method of claim 13, wherein the component is a downhole component configured to be disposed in a borehole in a resource bearing formation.

18. The method of claim 17, wherein a length of the tubular conduit forms a restriction, the first fluid pressure source is the borehole fluid upstream of the restriction, and the second fluid pressure source is the borehole fluid downstream of the restriction.

19. The method of claim 17, wherein the at least one power generation assembly includes a landing seat disposed in the tubular conduit, and the method further comprises establishing the first fluid pressure source and the second fluid pressure source by deploying the object in a borehole string and seating the object on the landing seat to cause the pressure differential between the section upstream of the landing seat and the section downstream of the landing seat when the object is seated.

20. The method of claim 19, wherein the at least one power generation assembly includes a bypass conduit configured to allow part of the borehole fluid to flow between the upstream section and the downstream section.

* * * * *